United States Patent
Wood et al.

(10) Patent No.: US 11,621,456 B2
(45) Date of Patent: Apr. 4, 2023

(54) LAMINABLE, DIMENSIONALLY-STABLE MICROPOROUS WEBS

(71) Applicant: Amtek Research International LLC, Lebanon, OR (US)

(72) Inventors: Weston J. Wood, Lebanon, OR (US); Daniel K. Lee, Lebanon, OR (US); Richard W. Pekala, Corvallis, OR (US)

(73) Assignee: Amtek Research International LLC, Lebanon, OR (US)

(*) Notice: Subject to any disclaimer, the term of this patent is extended or adjusted under 35 U.S.C. 154(b) by 0 days.

(21) Appl. No.: 16/081,691

(22) PCT Filed: Mar. 14, 2017

(86) PCT No.: PCT/US2017/022382
§ 371 (c)(1),
(2) Date: Aug. 31, 2018

(87) PCT Pub. No.: WO2017/160892
PCT Pub. Date: Sep. 21, 2017

(65) Prior Publication Data
US 2019/0386274 A1    Dec. 19, 2019

Related U.S. Application Data

(60) Provisional application No. 62/363,836, filed on Jul. 18, 2016, provisional application No. 62/308,112, filed on Mar. 14, 2016.

(51) Int. Cl.
*H01M 50/403*    (2021.01)
*H01M 50/44*    (2021.01)
(Continued)

(52) U.S. Cl.
CPC ....... *H01M 50/403* (2021.01); *H01M 50/411* (2021.01); *H01M 50/431* (2021.01);
(Continued)

(58) Field of Classification Search
CPC .......................... H01M 2/145; H01M 50/403
See application file for complete search history.

(56) References Cited

U.S. PATENT DOCUMENTS 6,753,114 B2    6/2004  Jacobs et al.
7,452,592 B2 *  11/2008 Cowton ................ C08J 7/0427
                                                    428/323

(Continued)

FOREIGN PATENT DOCUMENTS

CN    103296236 A      9/2013
CN    104157819     *  11/2014
(Continued)

OTHER PUBLICATIONS

PCT/US2017/022382, International Search Report and Written Opinion, dated Jul. 19, 2017, 17 pages.
(Continued)

*Primary Examiner* — Ula C Ruddock
*Assistant Examiner* — Thomas H. Parsons
(74) *Attorney, Agent, or Firm* — Dorsey & Whitney LLP

(57) ABSTRACT

Laminable microporous polymer webs with good dimensional stability are disclosed herein. Methods of making and using laminable microporous polymer webs with good dimensional stability are also disclosed herein.

20 Claims, 5 Drawing Sheets

(51) Int. Cl.
*H01M 50/411* (2021.01)
*H01M 50/431* (2021.01)
*H01M 50/449* (2021.01)

(52) U.S. Cl.
CPC ......... *H01M 50/44* (2021.01); *H01M 50/449* (2021.01); *H01M 2220/20* (2013.01)

(56) References Cited

U.S. PATENT DOCUMENTS

| | | |
|---|---|---|
| 8,795,826 B2* | 8/2014 | Lee .................... B01D 67/0079 428/315.5 |
| 2004/0010909 A1 | 1/2004 | Emanuel et al. |
| 2007/0292750 A1 | 12/2007 | Beard |
| 2009/0111025 A1 | 4/2009 | Lee et al. |
| 2010/0285348 A1* | 11/2010 | Murata ................ B32B 27/306 429/144 |
| 2012/0028104 A1 | 2/2012 | Brant et al. |
| 2012/0064399 A1 | 3/2012 | Carlson |
| 2012/0145468 A1 | 6/2012 | Pekala et al. |
| 2012/0164513 A1 | 6/2012 | Peng et al. |
| 2013/0029126 A1 | 1/2013 | Yen |
| 2013/0224555 A1 | 8/2013 | Hong et al. |

FOREIGN PATENT DOCUMENTS

| | | |
|---|---|---|
| CN | 104157819 A | 11/2014 |
| CN | 105229066 A | 1/2016 |
| KR | 1020120057560 A | 6/2012 |
| KR | 1020150131300 A | 11/2015 |
| WO | 2014145849 A1 | 9/2014 |
| WO | 2016031466 A1 | 3/2016 |
| WO | 2017160892 A1 | 9/2017 |

OTHER PUBLICATIONS

PCT/US2017/022382, International Preliminary Report on Patentability, dated Sep. 27, 2018, 10 pages.
PCT/US2019/020625, International Search Report and Written Opinion, dated Jul. 1, 2019, 11 pages.

* cited by examiner

LAMINABLE, DIMENSIONALLY-STABLE MICROPOROUS WEBS

RELATED APPLICATIONS

This application is a national stage filing under U.S.C. § 371 of International Patent Application No. PCT/US2017/022382, filed Mar. 14, 2017, which claims the benefit under 35 U.S.C. § 119(e) of U.S. Provisional Application No. 62/363,836, filed Jul. 18, 2016 and U.S. Provisional Application No. 62/308,112, filed Mar. 14, 2016, each of which is hereby incorporated by reference herein in its entirety.

COPYRIGHT NOTICE

© 2017 Amtek Research International LLC. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

The present disclosure relates to the formation of free-standing microporous polymer webs that (1) exhibit good in-plane dimensional stability (i.e., low shrinkage) at temperatures both above and below the melting point of the base polymer membrane, (2) maintain shutdown properties, and (3) are laminable to electrodes. At high temperatures, the pores within the bulk structure of the base polymer membrane can begin to collapse or shut down and thereby modify its permeability. Such webs can be used as separators to improve the manufacturability, performance, and safety of energy storage devices such as lithium-ion batteries.

BACKGROUND INFORMATION

Separators are an integral part of the performance, safety, and cost of lithium-ion batteries. During normal operation, the principal functions of the separator are to prevent electronic conduction (i.e., short circuit or direct contact) between the anode and cathode while permitting ionic conduction by means of the electrolyte. For small commercial cells under abuse conditions, such as external short circuit or overcharge, the separator is required to shutdown at temperatures well below those at which thermal runaway can occur. This requirement is described in Doughty. D, *Proceedings of the Advanced Automotive Battery Conference*, Honolulu, HI. (June 2005). Shutdown results from the collapse of pores in the separator caused by melting and viscous flow of the polymer, thus slowing down or stopping ion flow between the electrodes. Nearly all lithium-ion battery separators contain polyethylene as part of a single- or multi-layer construction so that shutdown often begins at about 130° C., the melting point of polyethylene.

Separators for the lithium-ion market are presently manufactured through the use of "dry" or "wet" processes. Celgard LLC and others have described a dry process, in which polypropylene (PP) or polyethylene (PE) is extruded into a thin sheet and subjected to rapid drawdown. The sheet is then annealed at 10-25° C. below the polymer melting point such that crystallite size and orientation are controlled. Next, the sheet is rapidly stretched in the machine direction (MD) to achieve slit-like pores or voids. Trilayer PP/PE/PP separators produced by the dry process are commonly used in lithium-ion rechargeable batteries.

Wet process separators composed of polyethylene are produced by extrusion of a plasticizer/polymer mixture at elevated temperature, followed by phase separation, biaxial stretching, and extraction of the pore former (i.e., plasticizer). The resultant separators have elliptical or spherical pores with good mechanical properties in both the machine and transverse directions. PE-based separators manufactured this way by Toray Tonen Specialty Separator, Asahi Kasei Corp., SK Innovation Co., Ltd., and Entek® Membranes LLC have found wide use in lithium-ion batteries.

More recently, battery failures arising in commercial operation have demonstrated that shutdown is not a guarantee of safety. The principal reason is that, after shutting down, residual stress and reduced mechanical properties above the polymer melting point can lead to shrinkage, tearing, or pinhole formation. The exposed electrodes can then touch one another and create an internal short circuit that leads to more heating, thermal runaway, and explosion.

In the case of large format lithium-ion cells designed for hybrid or plug-in hybrid applications (HEV, PHEV), the benefits of separator shutdown have been openly questioned because it is difficult to guarantee a sufficient rate and uniformity of shutdown throughout the complete cell. This issue is described in Roth, E. P., *Proceedings of Lithium Mobile Power Conference*, San Diego, Calif. (October 2007). Many companies are focused, therefore, on modifying the construction of a lithium-ion battery to include (1) a heat-resistant separator or (2) a heat-resistant layer coated on either the electrodes or a conventional polyolefin separator. Heat-resistant separators composed of high temperature polymers (e.g., polyimides, polyester, and polyphenylene sulfide) have been produced on a limited basis from solution casting, electrospinning, or other process technologies. In these cases, the high polymer melting point prevents shutdown at temperatures below 200° C.

U.S. Patent Application Pub. No. US 2012/0145468 describes a freestanding, microporous, ultrahigh molecular weight polyethylene (UHMWPE)-based separator that contains sufficient inorganic filler particles to provide low shrinkage while maintaining high porosity at temperatures above the melting point of the polymer matrix (>135° C.). Such freestanding, heat resistant separators have excellent wettability and ultralow impedance, but they do not exhibit shutdown properties because of the high loading level of the inorganic filler.

U.S. Pat. No. 7,638,230 B2 describes a porous heat resistant layer coated onto the negative electrode of a lithium-ion secondary battery. The heat resistant layer is composed of an inorganic filler and a polymer binder. Inorganic fillers include magnesia, titania, zirconia, or silica. Polymer binders include polyvinylidene fluoride and a modified rubber mixture containing acrylonitrile units. Higher binder contents negatively impact the high rate discharge characteristics of the battery.

U.S. Patent Application Pub. Nos. US 2008/0292968 A1 and US 2009/0111025 A1 each describe an organic/inorganic separator in which a porous substrate is coated with a mixture of inorganic particles and a polymer binder to form an active layer on at least one surface of the porous substrate. The porous substrate can be a non-woven fabric, a membrane, or a polyolefin-based separator. Inorganic particles are selected from a group including those that exhibit one or more of dielectric constant greater than 5, piezoelectricity, and lithium ion conductivity. Selected polymer binders are described. The composite separator is said to exhibit excellent thermal safety, dimensional stability, electrochemical safety, and lithium ion conductivity, compared to uncoated polyolefin-based separators used in lithium-ion batteries. In the case of certain polymer binders mixed with the inorganic particles, a high degree of swelling with an electrolyte can result in the surface layer, but rapid wetting or swelling is not achieved in the polyolefin substrate.

In the latter two of the above approaches, there is an inorganic-filled layer that is applied in a secondary coating operation onto the surface of an electrode or porous substrate to provide heat resistance and prevent internal short circuits in a battery.

SUMMARY OF THE DISCLOSURE

Several embodiments of the freestanding microporous polymer webs rely upon ultrahigh molecular weight polyethylene (UHMWPE) as a polyolefin base membrane component. The repeat unit of polyethylene is $(-CH_2CH_2-)_x$, where x represents the average number of repeat units in an individual polymer chain. In the case of polyethylene used in many film and molded part applications, x equals about 10,000; whereas for UHMWPE, x is approximately 150,000. This extreme difference in the number of repeat units is responsible for a higher degree of chain entanglement and the distinctive properties associated with UHMWPE.

One such property is the ability of UHMWPE to resist material flow under its own weight when heated above its melting point. This phenomenon is a result of its ultrahigh molecular weight and the associated long relaxation times, even at elevated temperatures. Although UHMWPE is commonly available, it is difficult to process into fiber, sheet, or membrane form. The high melt viscosity requires a compatible plasticizer and a twin screw extruder for disentanglement of the polymer chains such that the resultant gel can be processed into a useful form. This approach is commonly referred to as "gel processing." In many cases, other polyolefins are blended with UHMWPE to lower the molecular weight distribution to impact properties after extraction of the plasticizer, which extraction results in a porous membrane.

For most of the preferred embodiments described, the microporous polyolefin membrane is manufactured by combining UHMWPE, high density polyethylene (HDPE), and a plasticizer (e.g., mineral oil). A mixture of UHMWPE and HDPE is blended with the plasticizer in sufficient quantity and extruded to form a homogeneous, cohesive mass. The mass is processed using blown film, cast film, or calendering methods to give an oil-filled sheet of a reasonable thickness (<250 µm). The oil-filled sheet can be further biaxially oriented to reduce its thickness and affect its mechanical properties. In an extraction operation, the oil is removed with a solvent that is subsequently evaporated to produce a microporous polyolefin membrane that is subsequently coated with an inorganic surface layer.

"Freestanding" refers to a web having sufficient mechanical properties that permit manipulation such as winding and unwinding in film form for use in an energy storage device assembly.

In a first preferred embodiment, the polyolefin base membrane is passed through an aqueous-based dispersion, such as an alcohol/water dispersion of a inorganic material. The inorganic material can include an inorganic oxide, carbonate, or hydroxide, such as, for example, alumina, silica, zirconia, titania, mica, boehmite, magnesium hydroxide, calcium carbonate, and mixtures thereof. A surface coating of controlled thickness can be formed with wire-wound rods (e.g., Mayer rods) as the membrane is pulled through the aqueous-based dispersion. The wetted membrane is subsequently dried with a series of air knives and an oven in which hot air is used to evaporate the liquid phase, thereby forming a first porous layer on one or both of the major surfaces of the microporous polymer web.

At high temperatures, the pores within the bulk structure of the base polyolefin membrane can begin to collapse or shut down, thereby modifying its permeability and reducing ionic conduction. This in turn shuts down the battery cell. In the first preferred embodiment, the inorganic material surface coating has at least a threshold coating ratio of the inorganic material to polyolefin on a weight basis sufficient to maintain in-plane dimensional stability (in the plane defined by the machine direction and the transverse direction) above the melting point of the polyolefin membrane (such as about 45° C. above the melting point of the polyolefin membrane). This prevents contact between the electrodes while the battery cell is shutting down due to loss of ionic conduction.

In the first preferred embodiment, the dried inorganic material coated microporous polyolefin membrane is then passed through a second aqueous dispersion, such as an alcohol/water dispersion of a gel-forming polymer material. A surface coating of controlled thickness can be formed one or both sides with wire-wound rods (e.g., Mayer rods) as the coated membrane is pulled through the second aqueous-based dispersion. The twice coated membrane is subsequently dried with a series of air knives and an oven in which hot air is used to evaporate the liquid phase. The gel-forming material forms a porous layer with passageways for ionic conduction.

In the first preferred embodiment, the gel-forming material is formed into a second porous layer by drying suspended polymer solids. The drying is performed at a temperature below the glass transition temperature or the crystalline melting temperature of the suspended polymer solids (depending on whether the polymer solids are primarily amorphous or crystalline). Thus, the shape of the suspended polymer solids do not substantially change during the drying process. Alternatively, the gel-forming material could be formed into a second porous layer from the phase separation and drying of a polymer-solvent mixture, such as by processes disclosed in U.S. Pat. No. 6,586,138, the contents of which are incorporated herein by reference. Examples of the gel-forming polymer material for either formation process include, but are not limited to, polyvinylidene fluoride, poly(vinylidene fluoride-hexafluoropropylene) copolymers, poly(vinylidene fluoride-acrylic acid) copolymers, polyacrylate copolymers, polymethacrylate copolymers, and mixtures thereof. The resultant separators exhibit excellent high temperature thermal stability, high peel-strength (i.e., good ability to laminate), and low Gurley (i.e., high air permeability) values.

In a second preferred embodiment, the second aqueous dispersion is combined with the first aqueous dispersion, such that the polyolefin based membrane is coated with a porous composite of inorganic material and gel-forming polymer material with passageways. The composite is then dried as discussed above in the first preferred embodiment.

In both the first and second preferred embodiments, the gel-forming polymer material with passageways, once dried, is not in gel form. In both preferred embodiments, the gel-forming polymer material gels in the presence of electrolyte during manufacture of the energy storage device. Preferably, heat and pressure are also required for the gel-forming polymer material to form a gel. When in gel form, the gel-forming polymer material provides for lamination to an adjacent electrode. Although the gel-forming polymer material is not in gel form after drying of the battery separator, the gel-forming polymer material can be pre-swollen with plasticizer, prior to forming a gel.

In both preferred embodiments, an organic hydrogen bonding component may be present, such about 5% or less, in each of the aqueous-based dispersions (first aqueous-based dispersion in the first preferred embodiment). Preferred organic hydrogen bonding components include both polymers and small molecules with multiple hydrogen bonding sites. Preferred polymers include polyvinyl alcohol (PVOH), polyvinylpyrrolidone (PVP), carboxymethyl cellulose (CMC), polyacrylic acid, and polyethylene oxide. Preferred small molecules include catechol, sucrose, tannic acid, maltitol, dimethylol dihydroxyethylene urea (DMD-HEU), and pentaerythritol.

In the first preferred embodiment, the second aqueous-based dispersion can also include a cross-linking agent. The cross-linking agent is selected so as to be able to penetrate into the first porous layer and react with the organic hydrogen bonding component. The cross-linking agent can thus be included in the first porous layer. Exemplary cross-linking agents include boric acid, glycerol glycidyl ether, citric acid, succinic acid, gluteraldehyde, maleic acid, and sodium borate.

Additionally, in both embodiments, the inorganic material preferably has a sufficient ratio of nanoparticles to microparticles at a threshold coating ratio that minimizes the thickness of the first porous layer. For example, the inorganic material may include particles with an average diameter of less than or equal to 100 nm.

Finally, for each of the above embodiments, corona treatment of the polyolefin-based membrane can improve the overall peel strength of the coated separator. Applicants believe that oxygen-containing species (e.g., hydroxyl groups) resulting from the corona treatment of the polyolefin membrane surface hydrogen bond with the inorganic particles to improve the adhesive strength at the interface between the inorganic surface layer and the polyolefin membrane.

The resultant microporous, freestanding polyolefin separator as described for preferred embodiments can be wound or stacked in a package to separate the electrodes in an energy storage device, for example, a battery, capacitor, supercapacitor, or fuel cell. Electrolyte can be added to gel the gel-forming polymer material and to fill the pores both in the inorganic material and throughout the bulk structure of the base polymer membrane. Such separators are beneficial to the manufacture of energy storage devices, particularly since they combine good heat resistance, in-plane dimensional stability, are laminable, and shutdown characteristics.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
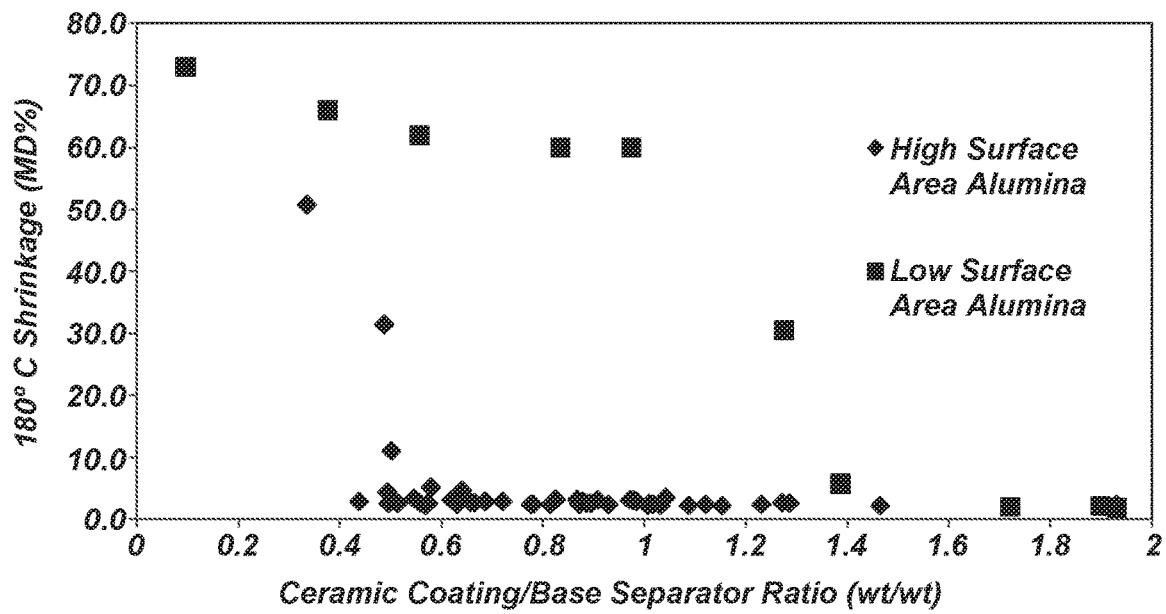
FIG. 1 depicts the results of thermal shrinkage using high and low surface area inorganic particles.

The base membrane utilizes a polyolefin matrix. The polyolefin most preferably used is an ultrahigh molecular weight polyethylene (UHMWPE) having an intrinsic viscosity of at least 10 deciliter/gram, and preferably in the range from 18-22 deciliters/gram. It is desirable to blend the UHMWPE with other polyolefins such as HDPE or linear low density polyethylene (LLDPE) to impact the shutdown properties of the membrane. Membranes can also be manufactured from other polyolefins or their blends, such as, for example, ethylene-propylene copolymers, polypropylene, and polymethyl pentene.

The plasticizer employed is a nonevaporative solvent for the polymer and is preferably a liquid at room temperature. The plasticizer has little or no solvating effect on the polymer at room temperature; it performs its solvating action at temperatures at or above the softening temperature of the polymer. For UHMWPE, the solvating temperature would be above about 160° C., and preferably in the range of between about 180° C. and about 240° C. It is preferred to use a processing oil, such as a paraffinic oil, naphthenic oil, aromatic oil, or a mixture of two or more such oils. Examples of suitable processing oils include: oils sold by Shell Oil Company, such as Gravex™ 942; oils sold by Calumet Lubricants, such as Hydrocal™ 800; and oils sold by Nynas Inc., such as HR Tufflo® 750.

The polymer/oil mixture is extruded through a sheet die or annular die, and then it is biaxially oriented to form a thin, oil-filled sheet. Any solvent that is compatible with the oil can be used for the extraction step, provided it has a boiling point that makes it practical to separate the solvent from the plasticizer by distillation. Such solvents include 1,1,2 trichloroethylene; perchloroethylene; 1,2-dichloroethane; 1,1,1-trichloroethane; 1,1,2-trichloroethane; methylene chloride; chloroform; 1,1,2-trichloro-1,2,2-trifluoroethane; isopropyl alcohol; diethyl ether; acetone; hexane; heptane; and toluene. In some cases, it is desirable to select the processing oil such that any residual oil in the polyolefin membrane after extraction is electrochemically inactive.

The coating formulations used in the first aqueous-based dispersion of both preferred embodiments is composed of inorganic particles in which greater than 50% water is counted in the liquid phase. The inorganic particles are typically charge stabilized and stay suspended in the alcohol/water mixture. An organic hydrogen bonding component, such as low molecular weight, water-soluble polymer, is also present. It is desirable to choose a polymer with numerous hydrogen bonding sites to minimize its concentration, yet achieve a robust, microporous inorganic surface layer that does not easily shed inorganic particles. Polyvinyl alcohol is a preferred organic hydrogen bonding component such that fewer than 5 parts of PVOH can be used with 95 parts or more of the inorganic particles. This organic hydrogen bonding component imparts high peel strength and good in-plane dimensional stability to the coated membrane, while being suitable for coating application from an aqueous-based dispersion.

In addition to controlling the amount of organic hydrogen bonding component and inorganic particles in the coating formulation, applicants believe it is important to control the particle size distribution of the inorganic particles. Furthermore, the coating formulation was carefully applied to the polyolefin base membrane to control the thickness of the resultant inorganic surface layer.

FIG. 1 indicates that alumina coated separators with higher surface area (i.e., smaller size) require much lower loadings in order to reach low thermal shrinkage below 5% at 180° C. However, the higher surface area particles retain more moisture than the low surface area particles (i.e., larger size particles). One approach to address the moisture retention is to use a blend of high and low surface area particles. Low surface area particles ("microparticles") do not tend to retain as much moisture as the high surface area particles ("nanoparticles").

As used herein, "nanoparticles" refers to individual particles or multi-particle aggregates with a mean size less than or equal to about 100 nanometers. The term "microparticles" refers to individual particles, multi-particle aggregates, or multi-aggregate agglomerates with a mean size larger than 100 nanometers to about 1 micron. As used herein, the nanoparticles are not small enough to penetrate into the bulk structure of the polyolefin membrane. Similarly, "nanoporous" indicates pores are present with a mean size of about 100 nm or less and "microporous" indicates pores are present with a mean size of greater than about 100 nm to about 1 micron.

Figure 2:
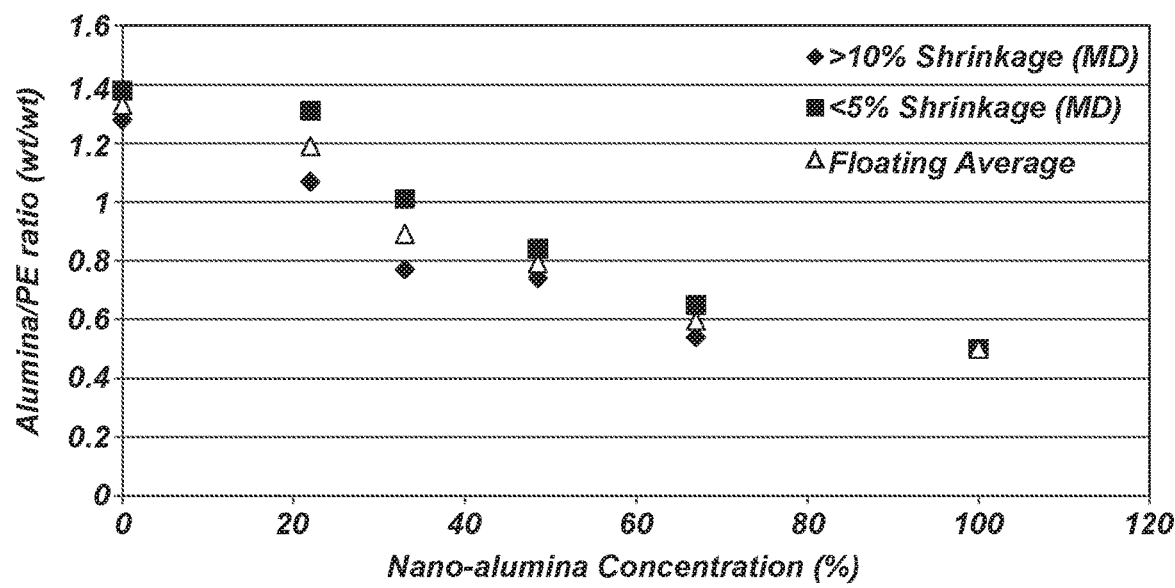
FIG. 2 depicts threshold coating ratio based on a ratio of high and low surface area inorganic particles.

FIG. 2 depicts the impact of particle size distribution on total coating thickness. The y-axis is alumina/polyethylene ratio on a weight-to-weight basis (i.e., the coating ratio). The polyethylene weight of the base membrane was not changed, but the thickness of the alumina coating (included 3% PVOH) was changed to change the weight of the alumina coating. Likewise, the ratio of nanoparticles to microparticles was changed (see x-axis of FIG. 2).

The results indicate that as the percentage of nanoparticles increases, then the thickness of the alumina coating can be decreased while maintaining dimensional stability. Or stated another way, the threshold coating ratio of inorganic particles to base membrane (i.e., minimum ratio to maintain dimensional stability) decreases as the percentage of nanoparticles increases. It should be understood that the threshold coating ratio and threshold coating thickness (i.e., minimum coating thickness to maintain dimensional stability for a given base membrane thickness) refer to similar concepts. It should be understood that the threshold coating thickness can be achieved by coating one side of the membrane with the total thickness or by coating two sides of the membrane with half of the threshold thickness.

TABLE 1

Data depicted in FIG. 2

| Nanoparticle alumina concentration | coating ratio (Shrinkage above 10% MD) | Threshold coating ratio (Shrinkage below 5% MD) | Floating Average (wt/wt) |
|---|---|---|---|
| 0 | 1.28 | 1.38 | 1.33 |
| 22 | 1.07 | 1.31 | 1.19 |
| 33 | 0.77 | 1.01 | 0.89 |
| 48.5 | 0.74 | 0.84 | 0.79 |

TABLE 1-continued

Data depicted in FIG. 2

| Nanoparticle alumina concentration | coating ratio (Shrinkage above 10% MD) | Threshold coating ratio (Shrinkage below 5% MD) | Floating Average (wt/wt) |
|---|---|---|---|
| 67 | 0.54 | 0.65 | 0.595 |
| 100 | 0.5 | 0.5 | 0.5 |

Figure 3:
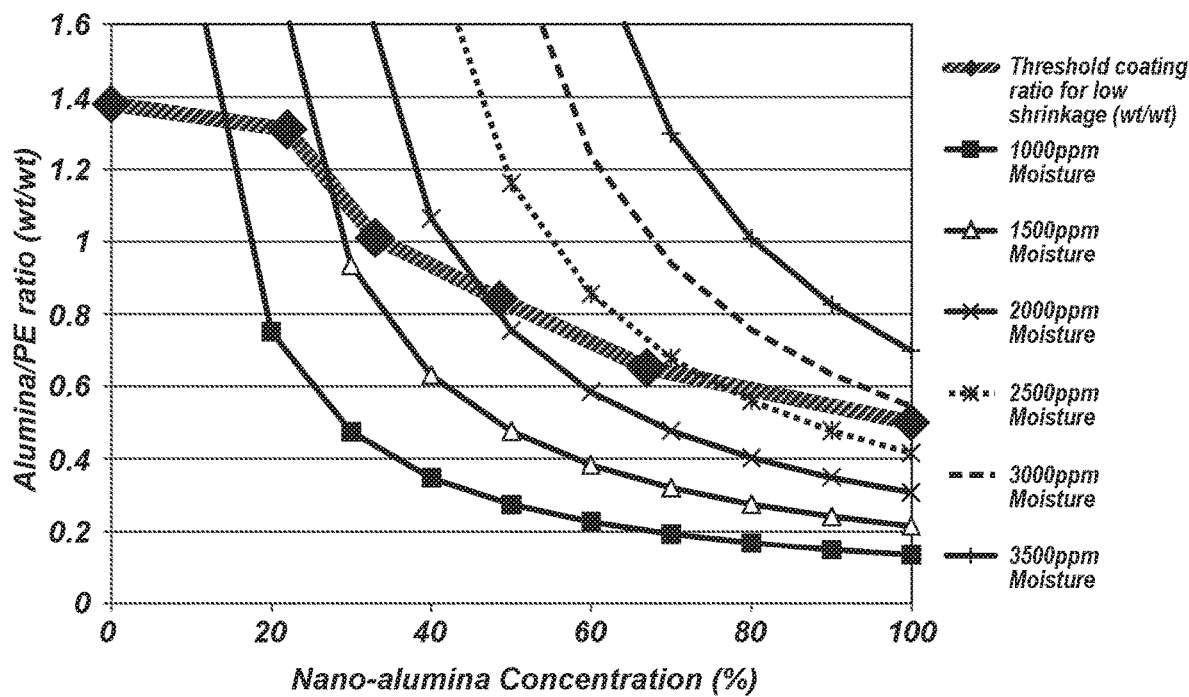
FIG. 3 depicts threshold coating ratio along with moisture curves for the different ratios of high and low surface area inorganic particles.

FIG. 3 depicts the threshold coating ratio data from FIG. 2, but includes moisture curves for the different nanoparticle ratios. Accordingly, it is possible to select an inorganic material to base membrane ratio and a nanoparticle concentration that achieves a desired dimensional stability with acceptable levels of moisture.

It should be understood that data used to develop the threshold coating ratios from FIGS. 2 and 3 are representative for various inorganic nanoparticle/microparticle combinations. However, the data was developed for a specific alumina/polyethylene separator system (see Examples 1 and 2 below). Thus, one of ordinary skill in the art, with the benefit of the present disclosure, would understand that other separator systems, such as using nanoparticle silica and microparticle silica and different types or thicknesses of polyethylene, would generate similar curves as depicted in FIGS. 1-3, but the curves may be shifted one direction or another. Additionally, the inorganic particles need not be of the same kind. For example, one kind of nanoparticle may be used, such as silica, and a different kind of microparticle may be used, such as alumina.

Figure 4:
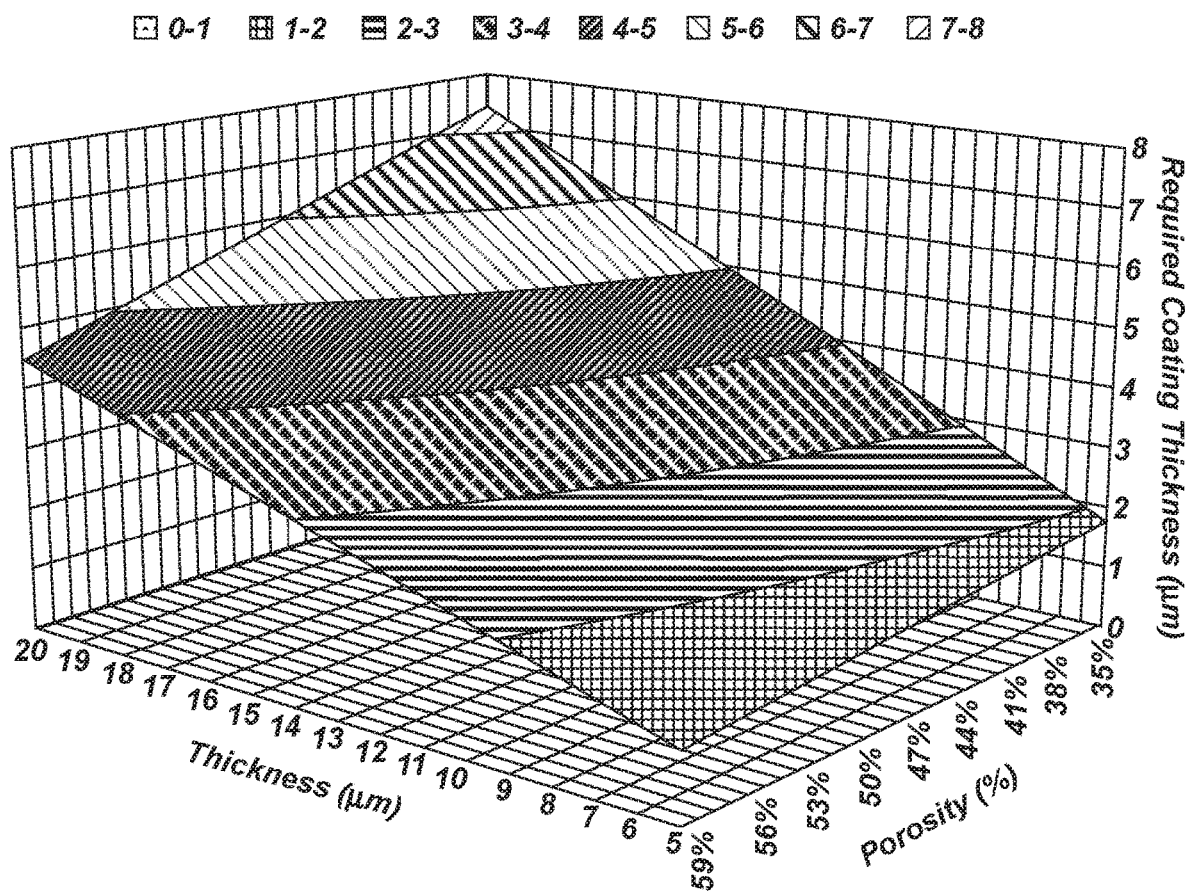
FIG. 4 illustrates the required coating thickness necessary to achieve a selected threshold coating ratio using low surface area inorganic particles.
Figure 5:
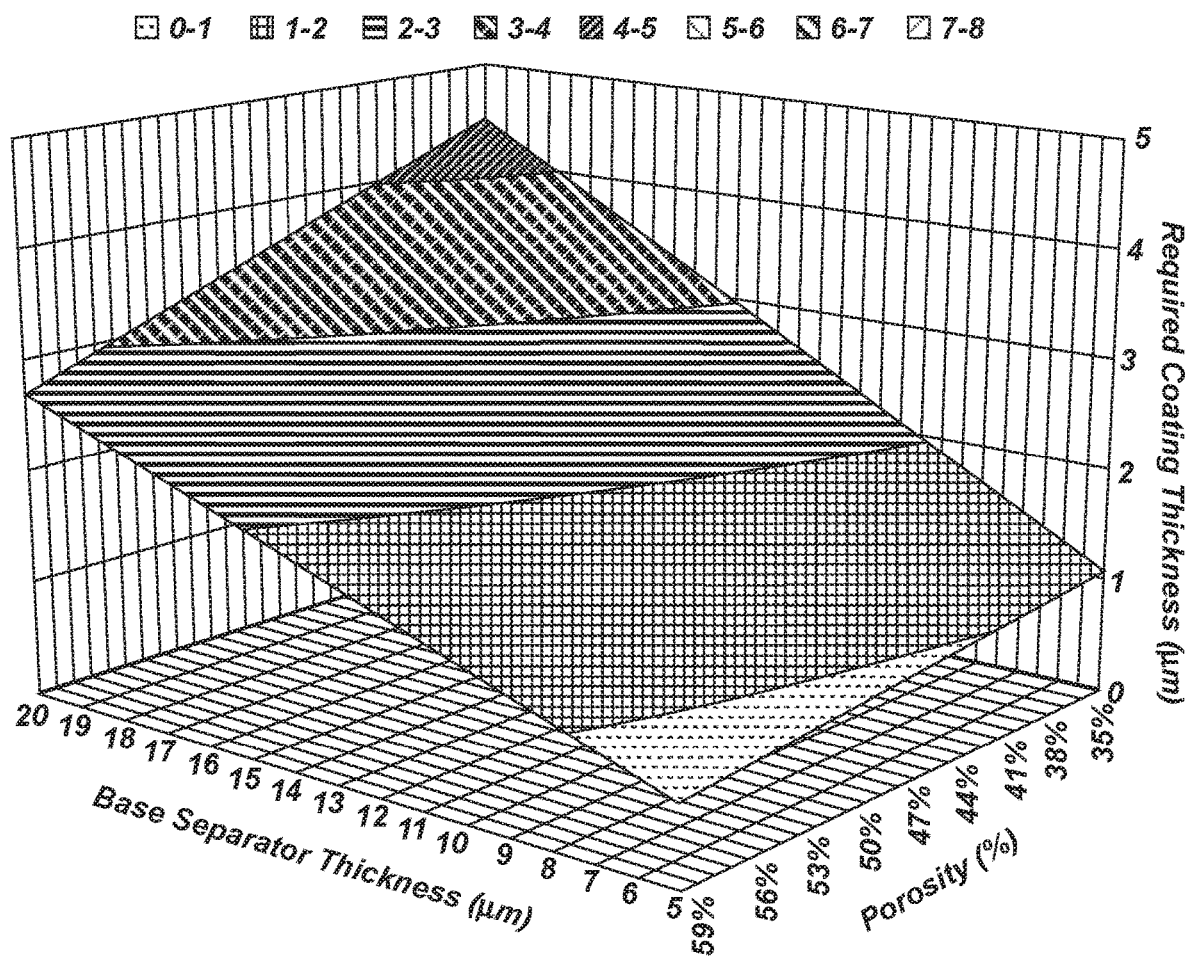
FIG. 5 illustrates the required coating thickness necessary to achieve a selected threshold coating ratio using high surface area inorganic particles.

FIGS. 4 and 5 further illustrate the impact of the surface area of the inorganic material on the threshold coating ratio. As depicted in FIG. 1, for the low-surface area alumina tested, the threshold coating ratio was about 1.4. For the high-surface area alumina, the threshold coating ratio was about 0.5 (although those numbers were calculated with the weight of the 3% PVOH included with the weight of the alumina).

FIG. 4 illustrates the required coating thickness necessary to achieve a threshold coating ratio of 1.3 when using the low surface area alumina used to generate the data for FIG. 1. Thickness and porosity of the polyethylene-containing base were varied along the horizontal axes. It was assumed that the polyethylene had a density of 0.96 g/cc. It was assumed that the density of the alumina coating was 2.2 g/cc.

FIG. 5 illustrates the required coating thickness necessary to achieve a threshold coating ratio of 0.5 using the high surface area alumina used to generate the data for FIG. 1. Thickness and porosity of the polyethylene-containing base were varied along the horizontal axes. It was assumed that the polyethylene had a density of 0.96 g/cc. It was assumed that the density of the alumina coating was 1.4 g/cc.

Comparing FIGS. 4 and 5, as the weight of the base web increases (due to increasing thickness or reduced porosity), then the weight of the inorganic particles required increases (and the corresponding thickness), so to achieve the selected threshold coating ratio. The higher surface area particles of FIG. 5 required less weight (and less corresponding thickness) to achieve the same dimensional stability as the lower surface area inorganic particles. Accordingly, the first porous layer may have a thickness such that a coating ratio on a weight-to-weight basis of the first porous layer to the microporous polyolefin web is greater than about 0.5. In particular, the first porous layer may have a thickness such that the coating ratio on a weight-to-weight basis of the first porous layer to the microporous polyolefin web is greater than about 1.4 when the inorganic material comprises 100% microparticles, greater than about 1.3 when the inorganic material comprises about 20% nanoparticles, greater than about 0.9 when the inorganic material comprises about 40% nanoparticles, greater than about 0.7 when the inorganic material comprises about 60% nanoparticles, greater than about 0.6 when the inorganic material comprises about 80% nanoparticles, or greater than about 0.5 when the inorganic material comprises about 100% nanoparticles.

FIGS. 1-5 relate to separators without the gel-forming polymer material present, either as a porous second coating layer (as in the first preferred embodiment) or as a composite (as in the second preferred embodiment) in the porous first coating layer. It is believed that the threshold coating ratio of inorganic particles is governed by the surface area and weight of the inorganic particles relative to the weight of the microporous polymer web. Therefore, the inorganic particle coated microporous polymer webs tested to generate data for FIGS. 1-5, could also be further coated, such as in the second aqueous-based dispersion of the first preferred embodiment with gel-forming polymer material, and retain dimensional stability.

Likewise, it is believed that the threshold coating ratio for composite separators, such as disclosed in the second preferred embodiment, is also governed by the surface area and weight of the inorganic particles relative to the weight of the microporous polymer web, even when additional materials are present, such as gel-forming polymer materials and organic hydrogen bonding components. Therefore, the concepts illustrated in FIGS. 1-5 apply equally to the second preferred embodiment as to the first preferred embodiment.

Figure 7:
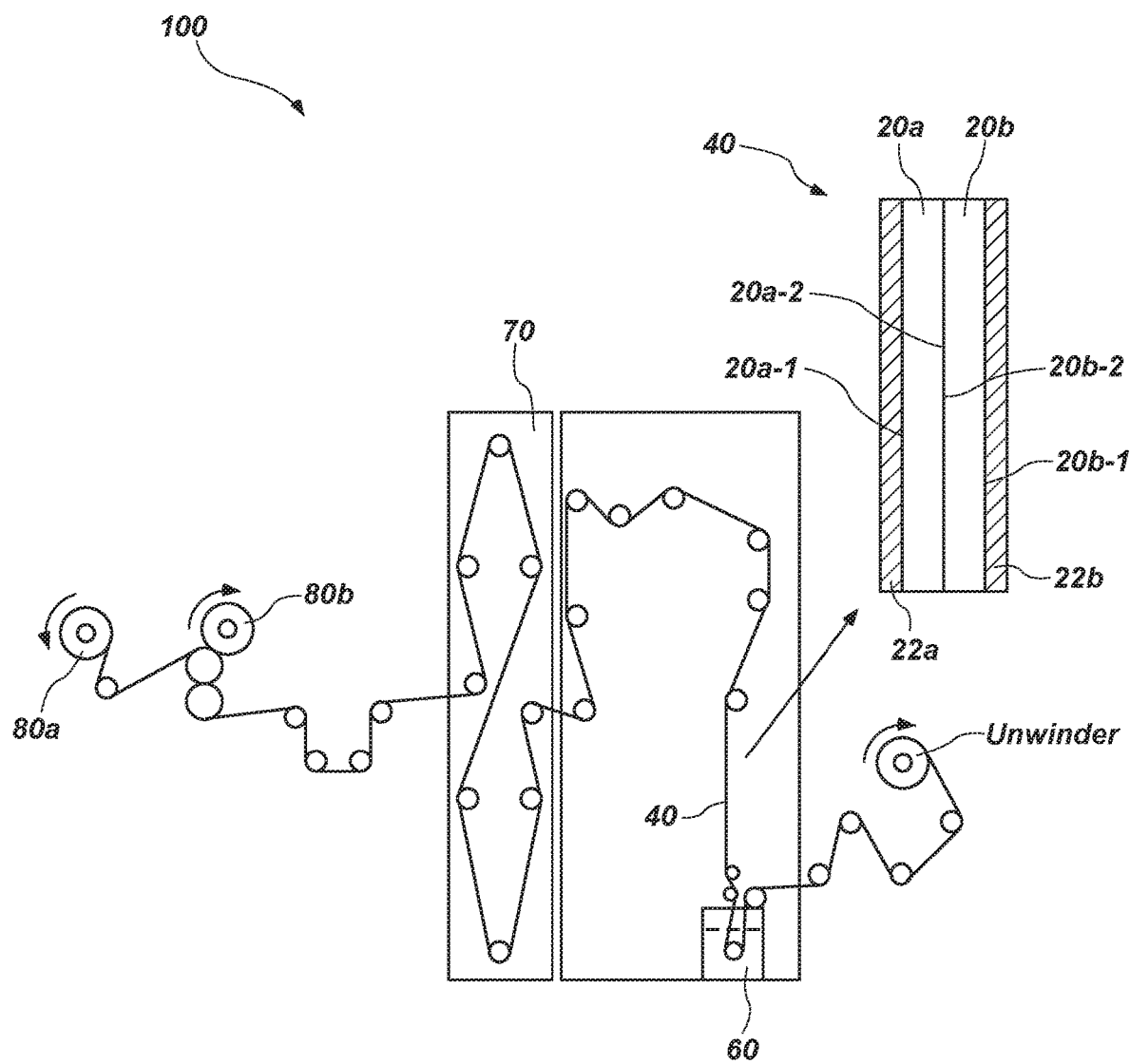
FIG. 7 illustrates an embodiment of a dip-coating process used to wet a single side of two microporous polyolefin webs at the same time.

FIG. 7 illustrates an exemplary dip-coating process 100 used to wet a single side (first major surfaces 20a-1 and 20b-1, respectively) of two microporous polyolefin webs 20a and 20b (collectively dual-layer web 40) at the same time. FIG. 7 also illustrates a close-up of the coated dual-layer web 40. As illustrated, second major surfaces 20a-2 and 20b-2 are already mated and wound together on a cardboard core. The dual-layer web 40 is unwound from the unwinder and dipped in a bath 60. Two Mayer rods can be used (one on each side of the dual-layer web 40) to control the thickness of coatings 22a and 22b formed on first major surfaces 20a-1 and 20b-1, respectively. The dual-layer web 40 is then dried with a series of air knives (not shown) and transported through a vertical oven 70. The dual-layer web 40 is then split into individual webs 20a and 20b, leaving the second major surfaces 20a-2 and 20b-2 uncoated. Web 20a and web 20b are then each wound onto its own core 80a and 80b, respectively.

The bath 60 can be an aqueous-based dispersion containing inorganic particles and an organic hydrogen bonding component and the coatings 22a and 22b a first porous layer. After separating web 20a from web 20b, each web can then be individually run through a second dip-coating and drying process (including, for example, a second bath containing a gel-forming polymer material and a cross-linking agent) to form a second porous layer on second major surfaces 20a-2 and 20b-2 as well as coatings 22a and 22b. Alternatively, prior to separating web 20a from web 20b, the dual-layer web 40 can be run through the second dip-coating and drying process to form a second porous layer only on coatings 22a and 22b. The dual-layer web 40 can then be separated, leaving the second major surfaces 20a-2 and 20b-2 uncoated.

A process similar to FIG. 7 can also be used to coat both sides of a single web 20a with the first porous layer and then with the second porous layer. Variations to the process illustrated in FIG. 7 may be made to coat a single web 20a on only one side with the first porous layer, the second porous, or both.

Example 1

A 16 μm thick, microporous ultrahigh molecular weight polyethylene-containing separator, Entek® EPH (Entek Membranes LLC, Oregon) was coated with an aqueous-based dispersion that contained the following:

| | |
|---|---|
| 14.3 g | Selvol 21-205 (aqueous based polyvinyl alcohol solution; 88% hydrolyzed; 21 wt % solids; Sekisui) |
| 236.7 g | Distilled water |
| 20 g | Isopropanol |
| 121.2 g | CAB-O-SPERSE PG 008 (40 wt. % alumina in water; Cabot Corporation) |
| 107.8 g | CEM-1 (45 wt % alumina in water, Saint Gobain) |

The coating dispersion contained 20 wt. % solids with a 48.5/48.5/3 Cabot alumina/Saint Gobain alumina//polyvinyl alcohol (PVOH) mass ratio. The CAB-O-SPERSE PG 008 is an aqueous dispersion of alumina with a primary particle size of 20 nm and a surface area of 81 m$^2$/g. The Saint Gobain CEM-1 is an aqueous dispersion of alumina with a mean particle size of 500 microns.

The separator was dip-coated through a bath containing the aqueous-based dispersion, and the thickness of the wet layer was controlled on each side with Mayer rods. The wetted separator was then dried with a series of air knives and transported through a vertical oven set at 80° C. and wound on a core, prior to testing.

The thermal shrinkage of the coated separator was determined. Three 100 mm×100 mm samples were cut from the separator. The samples were then suspended in an oven at 180° C. for 10 minutes. Upon removal, the samples were cooled to room temperature and then measured to determine their shrinkage in the machine direction (MD) and the transverse direction (TD).

TABLE 2

Coated separator characteristics

| Composition | Rod # | Wt. pickup (g/m$^2$) | Thickness pickup (μm) | 180° C. shrinkage MD % | 180° C. shrinkage TD % | Gurley (sec/100 ml) |
|---|---|---|---|---|---|---|
| 48.5/48.5/3 Cabot alumina/Saint Gobain alumina/PVOH | 12 | 5.2 | 3.2 | 53.8 | 25.9 | 258 |
| 48.5/48.5/3 Cabot alumina/Saint Gobain alumina/PVOH | 14 | 5.4 | 3.2 | 57.7 | 26.9 | 273 |

TABLE 2-continued

Coated separator characteristics

| Composition | Rod # | Wt. pickup (g/m$^2$) | Thickness pickup (μm) | 180° C. shrinkage MD % | 180° C. shrinkage TD % | Gurley (sec/100 ml) |
|---|---|---|---|---|---|---|
| 48.5/48.5/3 Cabot alumina/Saint Gobain alumina/PVOH | 18 | 5.5 | 3.5 | 51.5 | 20.7 | 262 |

Example 2

A 16 μm thick, microporous ultrahigh molecular weight polyethylene-containing separator, Entek® EPH (Entek Membranes LLC, Oregon) was coated with an aqueous-based dispersion that contained the following:

| 21.4 g | Selvol 21-205 (aqueous based polyvinyl alcohol solution; 88% hydrolyzed; 21 wt % solids; Sekisui) |
| 115 g | Distilled water |
| 20 g | Isopropanol |
| 181.9 g | CAB-O-SPERSE PG 008 (40 wt. % alumina in water; Cabot Corporation) |
| 161.7 g | CEM-1 (45 wt % alumina in water, Saint Gobain) |

The coating dispersion contained 30 wt. % solids with a 48.5/48.5/3 Cabot alumina/Saint Gobain alumina//polyvinyl alcohol (PVOH) mass ratio. The CAB-O-SPERSE PG 008 is an aqueous dispersion of alumina with a primary particle size of 20 nm and a surface area of 81 m$^2$/g. The Saint Gobain CEM-1 is an aqueous dispersion of alumina with a mean particle size of 0.5 μm.

The separator was dip-coated through a bath containing the aqueous-based dispersion, and the thickness of the wet layer was controlled on each side with Mayer rods. The wetted separator was then dried with a series of air knives and transported through a vertical oven set at 80° C. and wound on a core, prior to testing.

The thermal shrinkage of the coated separator was determined. Three 100 mm×100 mm samples were cut from the separator. The samples were then suspended in an oven at 180° C. for 10 minutes. Upon removal, the samples were cooled to room temperature and then measured to determine their shrinkage in the machine direction (MD) and the transverse direction (TD).

Example 3

A 12 μm thick, microporous ultrahigh molecular weight polyethylene-containing separator, Entek® LP (Entek Membranes LLC, Oregon) was coated with an aqueous-based dispersion that contained the following:

| 125 g | W640 ZX (40 wt. % fumed alumina; Evonik) |
| 153 g | Distilled water |
| 20 g | Isopropanol |
| 188 g | XPH 882 (25 wt. % PVDF-HFP, Solvay) |
| 14.3 g | Selvol 21-205 Polyvinyl alcohol aqueous solution (21 wt. %; 88% hydrolyzed; Sekisui) |

The coating dispersion contained 20 wt. % solids with a 50/47/3 alumina/PVDF-HFP/polyvinyl alcohol (PVOH) mass ratio. The separator was dip-coated through a bath containing the aqueous-based dispersion, and the thickness of the wet layer was controlled on each side with a #18 Mayer rod. The wetted separator was then dried with a series of air knives and transported through a vertical oven set at 80° C. and wound on a core, prior to testing. The separator had a final thickness of 17.9 μm and a Gurley value of 369 seconds/100 cc. The basis weight increased 6.3 g/m$^2$ after the coating and drying operations. After subtracting out the weight increase due to the PVDF-HFP, the weight of the alumina (including the PVOH) to the weight of the microporous polyethylene-containing base web yields a coating ratio of about 1.5.

The thermal shrinkage of the coated separator was determined. Three 100 mm×100 mm samples were cut from the separator. The samples were then suspended in an oven at 180° C. for 30 minutes. Upon removal, the samples were cooled to room temperature and then measured to determine

TABLE 3

Coated separator characteristics

| Composition | Rod # | Wt. pickup (g/m$^2$) | Thickness pickup (μm) | 180° C. shrinkage MD % | 180° C. shrinkage TD % | Gurley (sec/100 ml) |
|---|---|---|---|---|---|---|
| 48.5/48.5/3 Cabot alumina/Saint Gobain alumina/PVOH | 9 | 6.9 | 20.4 | 2.0 | 1.2 | 261 |
| 48.5/48.5/3 Cabot alumina/Saint Gobain alumina/PVOH | 12 | 10.4 | 22.6 | 1.5 | 0.7 | 299 |
| 48.5/48.5/3 Cabot alumina/Saint Gobain alumina/PVOH | 14 | 11.3 | 22.6 | 1.7 | 1.0 | 290 |
| 48.5/48.5/3 Cabot alumina/Saint Gobain alumina/PVOH | 18 | 13.5 | 24.2 | 1.0 | 0.5 | 295 | their shrinkage in the machine direction (MD) and the transverse direction (TD). Results showed average shrinkage values of 4.8% in the MD and 2.5% in the TD.

Example 4

Figure 6:
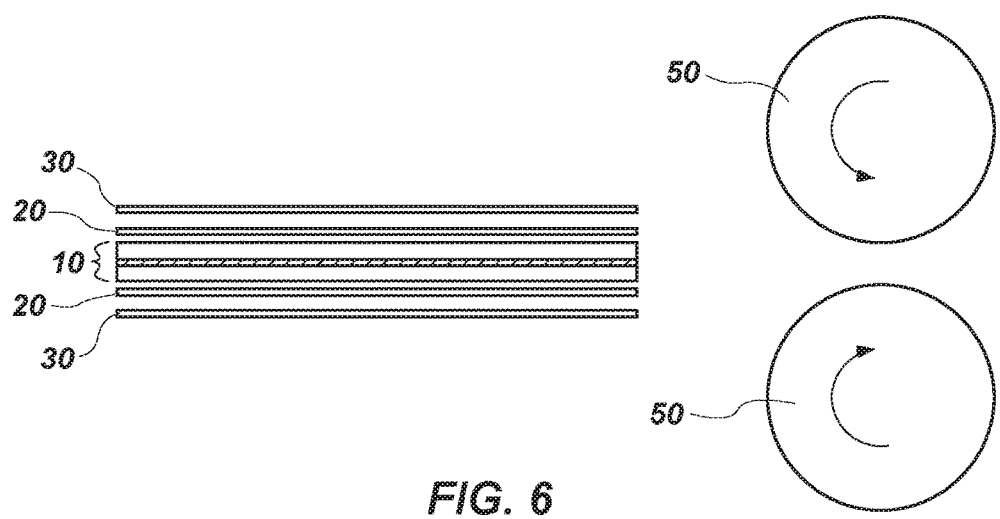
FIG. 6 illustrates the set up for separator/electrode lamination used in some of the examples.

Two samples of the coated separator 20 prepared in Example 3 were laminated to different sides of a graphite-based negative electrode 10 using an Innovative Machine Corp. laminator, Model 03-65-029. The negative electrode 10 used for lamination was 150 μm thick. A polyester film (34 μm thick) 30 was placed between each of the separator 20 samples and the laminator rolls 50 to be used as a releasing agent on each side of the separator/electrode/separator assembly 10/20/30. The laminator rolls 50 were heated to 100° C., the laminator roll gap was set to 220 μm, and the negative electrode/separator/release agent assembly 10/20/30 was fed through the laminator rolls 50 at 2.5 feet per minute, as shown in FIG. 6. FIG. 6 depicts the set up for separator 20/electrode 10 lamination. The peel strength of the separator 20/electrode 10 laminate after the lamination procedure was 3.5 N/m.

Example 5

A 12 m thick, microporous ultrahigh molecular weight polyethylene-containing separator, Entek® EP (Entek Membranes LLC, Oregon) was coated with an aqueous-based dispersion that contained the following:

| | |
|---|---|
| 424 g | CAB-O-SPERSE PG 008 (40 wt. % alumina; Cabot Corporation) |
| 31 g | Distilled water |
| 20 g | Isopropanol |
| 25 g | Selvol 21-205 Polyvinyl alcohol aqueous solution (21 wt. %; 88% hydrolyzed; Sekisui) |

The coating dispersion contained 35 wt. % solids with a 97/3 alumina/polyvinyl alcohol (PVOH) mass ratio. The separator was dip-coated through a bath containing the aqueous-based dispersion, and the thickness of the wet layer was controlled on each side with a #5 Mayer rod. The wetted separator was then dried with a series of air knives and transported through a vertical oven set at 80° C. and wound on a core, prior to testing. The separator had a final thickness of 16.6 μm and a Gurley value of 250 seconds/100 cc. The basis weight increased 6.4 g/m² after the coating and drying operations.

The thermal shrinkage of the coated separator was determined. Three 100 mm×100 mm samples were cut from the separator. The samples were then suspended in an oven at 180° C. for 30 minutes. Upon removal, the samples were cooled to room temperature and then measured to determine their shrinkage in the machine direction (MD) and the transverse direction (TD). Results showed average shrinkage values of 2.3% in the MD and 2.0% in the TD.

Example 6

The alumina coated separator from Example 5 was then coated with an aqueous-based dispersion that contained the following:

| | |
|---|---|
| 220 g | Kynar RC-278 (33 wt. % PVDF-HFP; Arkema) |
| 249 g | Distilled water |
| 20 g | Isopropanol |
| 10.7 g | Selvol 21-205 Polyvinyl alcohol aqueous solution (21 wt. %; 88% hydrolyzed; Sekisui) |

The coating dispersion contained 15 wt. % solids with a 97/3 PVDF-HFP/polyvinyl alcohol (PVOH) mass ratio. The separator was dip-coated through a bath containing the aqueous-based dispersion, and the thickness of the wet layer was controlled on each side with a #4 Mayer rod. The wetted separator was then dried with a series of air knives and transported through a vertical oven set at 80° C. and wound on a core, prior to testing. The separator had a final thickness of 17.9 μm and a Gurley value of 295 seconds/100 cc. The basis weight increased 1.9 g/m² after the coating and drying operations.

Example 7

Two samples of the coated separator 20 prepared in Example 6 were laminated to different sides of a graphite-based negative electrode 10 using an Innovative Machine Corp. laminator, Model 03-65-029. The negative electrode 10 used for lamination was 150 μm thick. A polyester film 30 (34 μm thick) was placed between each of the separator 20 samples and the laminator rolls 50 to be used as a releasing agent on each side of the separator/electrode/separator assembly 10/20/30. The laminator rolls 50 were heated to 100° C., the laminator roll gap was set to 220 μm, and the negative electrode/separator/release agent assembly 10/20/30 was fed through the laminator rolls 50 at 2.5 feet per minute, as shown in FIG. 6. The peel strength of the separator 20/electrode 10 laminate after the lamination procedure was 5.5 N/m.

Example 8

The alumina coated separator from Example 5 was coated with an acetone-based PVDF solution that contained the following:

| | |
|---|---|
| 24 g | Kynar 741 (Arkema) |
| 6 g | Kynar 2801 (Arkema) |
| 940 g | Acetone (ACS Grade, Aldrich) |
| 30 g | Distilled water |

The acetone-based solution was formed by first mixing the acetone and water components in a large glass flask and then dissolving Kynar 741 and Kynar 2801 in the acetone/water mixture. The PVDF containing mixture was heated to 50° C. while stirring, and a clear solution was formed. The acetone-based solution contained 3 wt. % solids with a 80/20 Kynar 741/Kynar 2801 mass ratio. The separator was dip-coated through a bath containing the acetone-based solution, and the thickness of the wet layer was controlled on each side with a #14 Mayer rod. The wetted separator was then dried with a series of air knives and transported through a vertical oven set at 80° C. and wound on a core, prior to testing. The separator had a final thickness of 17.9 μm and a Gurley value of 413 seconds/100 cc. The basis weight increased 1.3 g/m² after the coating and drying operations.

Example 9

A 14 μm thick, microporous ultrahigh molecular weight polyethylene-containing separator, Entek® EPH (Entek Membranes LLC, Oregon) was coated with an aqueous-based dispersion that contained the following:

| | |
|---|---|
| 495 g | CAB-O-SPERSE PG 008 (40 wt. % alumina in water; Cabot Corporation) |
| 698 g | CEH-1 (55 wt % alumina in water, Saint Gobain) |
| 85.7 g | Selvol 21-205 (aqueous based polyvinyl alcohol solution; 88% hydrolyzed; 21 wt % solids; Sekisui) |
| 641 g | Distilled water |
| 80 g | Isopropanol |

The coating dispersion contained 30 wt. % solids with a 97/3 alumina/polyvinyl alcohol (PVOH) mass ratio. The separator was dip-coated through a bath containing the aqueous-based dispersion, and the thickness of the wet layer was controlled on each side with #12 Mayer rods. The wetted separator was then dried with a series of air knives and transported through a vertical oven set at 80° C. and wound on a core, prior to testing. The separator had a final thickness of 19 μm and a Gurley value of 261 seconds/100 cc. The basis weight increased 9.2 g/m$^2$ after the coating and drying operations.

The thermal shrinkage of the coated separator was determined. Three 100 mm×100 mm samples were cut from the separator. The samples were then suspended in an oven at 180° C. for 10 minutes. Upon removal, the samples were cooled to room temperature and then measured to determine their shrinkage in the machine direction (MD) and the transverse direction (TD). Results showed average shrinkage values of 0.9% in the MD and 0.8% in the TD.

Example 10

The alumina coated separator from Example 9 was then coated with an aqueous-based BM-2510 dispersion (15 wt % solids, ZEON Chemicals). The separator was dip-coated through a bath containing the aqueous-based dispersion, and the thickness of the wet layer was controlled on each side with a #4 Mayer rod. The wetted separator was then dried with a series of air knives and transported through a vertical oven set at 80° C. and wound on a core, prior to testing. The separator had a final thickness of 21.6 μm and a Gurley value of 293 seconds/100 cc. The basis weight increased 1.7 g/m$^2$ after the coating and drying operations.

Example 11

A 14 μm thick, microporous ultrahigh molecular weight polyethylene-containing separator, Entek® EPH (Entek Membranes LLC, Oregon) was coated with an aqueous-based dispersion that contained the following:

| | |
|---|---|
| 52.9 g | Selvol 09-325 polyvinyl alcohol aqueous solution (8.5 wt % solids; 98% hydrolyzed; Sekisui) |
| 128.8 g | Distilled water |
| 20 g | Isopropanol |
| 123.7 g | CAB-O-SPERSE PG 008 (40 wt. % alumina in water; Cabot Corporation) |
| 174.6 g | CEH-1 (55 wt % alumina in water, Saint Gobain) |

The coating dispersion contained 30 wt. % solids with a 33/64/3 Cabot alumina/Saint Gobain alumina//polyvinyl alcohol (PVOH) mass ratio. The CAB-O-SPERSE PG 008 is an aqueous dispersion of alumina with a mean particle size of 20 nm, a mean aggregate size of 130 nm, and a surface area of 81 m$^2$/g. The Saint Gobain CEH-1 is an aqueous dispersion of alumina with a mean particle size of 500 micron. The separator was dip-coated through a bath containing the aqueous-based dispersion, and the thickness of the wet layer was controlled on each side with a #8 Mayer rod. The wetted separator was then dried with a series of air knives and transported through a vertical oven set at 80° C. and wound on a core, prior to testing. The separator had a final thickness of 18.3 μm and a Gurley value of 193 seconds/100 cc. The basis weight increased 8.4 g/m$^2$ after the coating and drying operations.

The thermal shrinkage of the coated separator was determined. Three 100 mm×100 mm samples were cut from the separator. The samples were then suspended in an oven at 180° C. for 30 minutes. Upon removal, the samples were cooled to room temperature and then measured to determine their shrinkage in the machine direction (MD) and the transverse direction (TD). Results showed average shrinkage values of 0.5% in the MD and 0.3% in the TD.

Example 12

The alumina coated separator from Example 11 was then coated with an aqueous-based dispersion that contained the following:

| | |
|---|---|
| 216 g | XPH 884 (25 wt. % PVDF-HFP; Solvay) |
| 134 g | Distilled water |
| 30 g | Isopropanol |
| 120 g | 5 wt % Boric acid dissolved in distilled water (ACS Grade; Sigma Aldrich) |

The coating dispersion contained 12 wt. % solids with a 90/10 PVDF-HFP/boric acid mass ratio. The separator was dip-coated through a bath containing the aqueous-based dispersion, and the thickness of the wet layer was controlled on each side with a #4 Mayer rod. The wetted separator was then dried with a series of air knives and transported through a vertical oven set at 80° C. and wound on a core, prior to testing. The separator had a final thickness of 19.9 μm and a Gurley value of 204 seconds/100 cc. The basis weight increased 0.7 g/m$^2$ after the coating and drying operations.

Example 13

The alumina coated separator from Example 11 was then coated with an aqueous-based dispersion that contained the following:

| | |
|---|---|
| 216 g | XPH 884 (25 wt. % PVDF-HFP; Solvay) |
| 248 g | Distilled water |
| 30 g | Isopropanol |
| 6 g | Grilbond G 1701 (EMS Griltech) |

The coating dispersion contained 12 wt. % solids with a 90/10 PVDF-HFP/Grilbond G 1701 mass ratio. The separator was dip-coated through a bath containing the aqueous-based dispersion, and the thickness of the wet layer was controlled on each side with a #4 Mayer rod. The wetted separator was then dried with a series of air knives and transported through a vertical oven set at 80° C. and wound on a core, prior to testing. The separator had a final thickness of 19.5 μm and a Gurley value of 204 seconds/100 cc. The basis weight increased 0.6 g/m$^2$ after the coating and drying operations.

Example 14

The alumina coated separator from Example 11 was then coated with an aqueous-based solution that contained the following:

| | |
|---|---|
| 475 g | Distilled water |
| 25 g | Grilbond G 1701 (EMS Griltech) |

The coating solution contained 5 wt. % solids. The separator was dip-coated through a bath containing the aqueous-based solution, and the thickness of the wet layer was controlled on each side with a #4 Mayer rod. The wetted separator was then dried with a series of air knives and transported through a vertical oven set at 80° C. and wound on a core, prior to testing. The separator had a final thickness of 18.4 µm and a Gurley value of 235 seconds/100 cc. The basis weight increased 0.3 g/m² after the coating and drying operations.

Example 15

The alumina coated separator from Example 11 was then coated with an aqueous-based dispersion that contained the following:

| | |
|---|---|
| 240 g | XPH 884 (25 wt. % PVDF-HFP; Solvay) |
| 230 g | Distilled water |
| 30 g | Isopropanol |

The coating dispersion contained 12 wt. % solids. The separator was dip-coated through a bath containing the aqueous-based dispersion, and the thickness of the wet layer was controlled on each side with a #4 Mayer rod. The wetted separator was then dried with a series of air knives and transported through a vertical oven set at 80° C. and wound on a core, prior to testing. The separator had a final thickness of 20.0 µm and a Gurley value of 215 seconds/100 cc. The basis weight increased 1.4 g/m² after the coating and drying operations.

Example 16

A coating adhesion strength test was performed in which separators prepared in Examples 11-15 were placed horizontally on a steel plate, and magnetic strips were placed on the edges of the separator to secure said separator. A pressure sensitive tape (3M Scotch® Magic™ Tape 810, ¾ inch width), was applied to the coated separator. The loose end of the tape was secured to a fixture clip, and the tape was peeled at 180° from the original tape orientation (i.e., 180° peel test configuration) at a speed of 44 cm/min and a distance of 10 cm. A force gauge (Omega DFG55-5) with a 25+/−0.001N load cell capacity was used to measure the force required to remove the coating from the base separator, and the maximum load was recorded. The test was repeated at least three times per sample. Results are shown in Table 5.

TABLE 5

| Example # | Description | 180° C. Peel strength (N/m, Average) | 180° C. Peel strength (N/m, Max) |
|---|---|---|---|
| Example 11 | Alumina coated separator | 68.0 | 227.1 |
| Example 12 | Coating with 90/10 PVDF-HFP/boric acid mass ratio onto separator prepared in Example 11. | 54.6 | 165.0 |
| Example 13 | Coating with 90/10 PVDF-HFP/Grilbond mass ratio onto separator prepared in Example 11. | 70.8 | 117.6 |
| Example 14 | 5 wt % Grilbond coated onto separator prepared in Example 11 | 91.8 | 248.0 |
| Example 15 | Coating with PVDF-HFP onto separator prepared in Example 11. | 34.3 | 46.3 |

Comparative Example 1

An aqueous-based dispersion was prepared containing the following:

| | |
|---|---|
| 89 g | Distilled water |
| 20 g | Isopropanol |
| 237.5 g | CAB-O-SPERSE PG 008 (40 wt. % alumina; Cabot Corporation) |
| 35.3 g | Selvol 09-325 polyvinyl alcohol aqueous solution (8.5 wt % solids; 98% hydrolyzed; Sekisui) |
| 40 g | 5 wt % Boric acid dissolved in distilled water (ACS Grade; Sigma Aldrich) |

The coating dispersion contained 20 wt. % solids with a 95/3/2 alumina/polyvinyl alcohol/boric acid mass ratio. The dispersion quickly gelled due to the crosslinking of PVOH with boric acid.

It will be apparent to those having skill in the art that many changes may be made to the details of the above-described embodiments without departing from the underlying principles of the invention. For example, an inorganic surface layer may be applied as a coating on a portion of the surface or the entire surface of a polyolefin membrane.

The invention claimed is:

1. A battery separator comprising:
a free-standing unitary multi-layer structure with first and second major surfaces, the structure comprising:
a microporous polymer web characterized by a melting point and having two major surfaces; and
an inorganic material including one or more of nano- or micro-particles deposited from an aqueous dispersion as a first porous layer on one or both of the major surfaces of the microporous polymer web, the first porous layer providing high-temperature dimensional stability above the melting point of the microporous polymer web even as fluid permeability of the unitary multi-layer structure is decreased at elevated temperature
wherein the nanoparticles include individual particles or multi-particle aggregates with a mean size less than or equal to 100 nanometers, and microparticles include individual particles, multi-particle aggregates, or multi-aggregate agglomerates with a mean size of 100 nanometers to 1 micrometer; and
wherein the first porous layer provides the high-temperature dimensional stability because one of the first porous layer exhibits a coating ratio of greater than about 1.4 and the inorganic material comprises 100% microparticles, the first porous layer exhibits a coating ratio of greater than about 1.3 and the inorganic material comprises 20% nanoparticles, the first porous layer exhibits a coating ratio of greater than about 0.9 and the inorganic material comprises 40% nanoparticles, the first porous layer exhibits a coating ratio of greater than about 0.7 and the inorganic material comprises 60% nanoparticles, the first porous layer exhibits a coating ratio of greater than about 0.6 and the inorganic material comprises 80% nanoparticles, or the first porous layer exhibits a coating ratio of greater than about 0.5 and the inorganic material comprises 100% nanoparticles, wherein the coating ratio is a weight-to-weight basis of the first porous layer to the microporous polyolefin web.

2. The battery separator of claim 1, in which the inorganic material comprises an inorganic oxide, carbonate, hydroxide, or mixtures thereof.

3. The battery separator of claim 2, in which the inorganic material comprises alumina, silica, zirconia, titania, mica, boehmite, magnesium hydroxide, calcium carbonate, or mixtures thereof.

4. The battery separator of claim 3, in which the first porous layer further comprises an organic hydrogen bonding component.

5. The battery separator of claim 4, in which the first porous layer further comprises a cross-linking agent reacted with the organic hydrogen bonding component.

6. The battery separator of claim 4, in which the organic hydrogen bonding component comprises about 5 wt % or less of the first porous layer.

7. The battery separator of claim 1, in which the inorganic material comprises particles with a sufficient ratio of nanoparticles to microparticles to minimize water content at or above a threshold coating ratio that minimizes thickness of the first porous layer.

8. The battery separator of claim 1, in which the microporous polymer web exhibits in-plane high temperature dimensional stability at 180° C.

9. The battery separator of claim 1, further comprising a second porous layer including a gel-forming polymer material with passageways formed on at least a portion of the first porous layer.

10. The battery separator of claim 9, in which the second porous layer comprises polyvinylidene fluoride, poly(vinylidene fluoride-hexafluoropropylene) copolymers, poly(vinylidene fluoride-acrylic acid) copolymers, polyvinylpyrrolidone, polyacrylamide, or mixtures thereof.

11. The battery separator of claim 9, in which the second porous layer is formed from drying a suspension comprising polymer solids.

12. The battery separator of claim 9, wherein the second porous layer is microporous.

13. The battery separator of claim 1, in which the microporous polymer web comprises a polyolefin.

14. A battery comprising:
a secondary cell having at least two electrodes contained in a package filled with electrolyte and separated by the battery separator of claim 1.

15. The battery of claim 14, in which the second porous layer has a peel strength of at least 3 N/m.

16. An electric motor vehicle power train, comprising:
a battery pack providing direct current power to an inverter to produce alternating current power, the battery pack including multiple electrically connected secondary cells, each of the multiple secondary cells having multiple electrodes contained in a package filled with electrolyte and separated by the battery separator of claim 1;
speed reduction gears operatively connected to a set of vehicle wheels; and
an electric motor operatively connected to the speed reduction gears and responding to the alternating current power produced by the inverter to impart motive force to the speed reduction gears and thereby turn the set of vehicle wheels.

17. A battery separator comprising:
a free-standing unitary multi-layer structure with first and second major surfaces, the structure comprising a microporous polymer web characterized by a melting point and having two major surfaces, an inorganic material including one or more of nano- or microparticles deposited from an aqueous dispersion as a first porous layer on both of the major surfaces of the microporous polymer web;
wherein the nanoparticles include individual particles or multi-particle aggregates with a mean size less than or equal to 100 nanometers, and microparticles include individual particles, multi-particle aggregates, or multi-aggregate agglomerates with a mean size of 100 nanometers to 1 micrometer; and
wherein the first porous layer provides high-temperature dimensional stability because one of the first porous layer exhibits a coating ratio of greater than about 1.4 and the inorganic material comprises 100% microparticles, the first porous layer exhibits a coating ratio of greater than about 1.3 and the inorganic material comprises 20% nanoparticles, the first porous layer exhibits a coating ratio of greater than about 0.9 and the inorganic material comprises 40% nanoparticles, the first porous layer exhibits a coating ratio of greater than about 0.7 and the inorganic material comprises 60% nanoparticles, the first porous layer exhibits a coating ratio of greater than about 0.6 and the inorganic material comprises 80% nanoparticles, or the first porous layer exhibits a coating ratio of greater than about 0.5 and the inorganic material comprises 100% nanoparticles, wherein the coating ratio is a weight-to-weight basis of the first porous layer to the microporous polyolefin web.

18. The battery separator of claim 17, in which the polymer web exhibits in-plane high temperature dimensional stability 180° C.

19. The battery separator of claim 17, in which the inorganic material comprises particles with a sufficient ratio of nanoparticles to microparticles to minimize water content at or above a threshold coating ratio that minimizes thickness of the first porous layer.

20. A battery separator comprising:
a free-standing unitary multi-layer structure with first and second major surfaces, the structure comprising a microporous polymer web characterized by a melting point and having two major surfaces, an inorganic material including one or more of nano- or microparticles deposited from an aqueous dispersion as a first porous layer on both of the major surfaces of the microporous polymer web, the first porous layer providing high-temperature dimensional stability above the melting point of the microporous polymer web even as fluid permeability of the unitary multi-layer structure is decreased at elevated temperature; and
wherein the nanoparticles include individual particles or multi-particle aggregates with a mean size less than or equal to 100 nanometers, and microparticles include individual particles, multi-particle aggregates, or multi-aggregate agglomerates with a mean size of 100 nanometers to 1 micrometer; and
wherein the first porous layer provides the high-temperature dimensional stability because one of the first porous layer exhibits a coating ratio of greater than about 1.4 and the inorganic material comprises 100% microparticles, the first porous layer exhibits a coating ratio of greater than about 1.3 and the inorganic material comprises 20% nanoparticles, the first porous layer exhibits a coating ratio of greater than about 0.9 and the inorganic material comprises 40% nanoparticles, the first porous layer exhibits a coating ratio of greater than about 0.7 and the inorganic material comprises 60% nanoparticles, the first porous layer exhibits a coating ratio of greater than about 0.6 and the inorganic material comprises 80% nanoparticles, or the first porous layer exhibits a coating ratio of greater than about 0.5 and the inorganic material comprises 100% nanoparticles, wherein the coating ratio is a weight-to-weight basis of the first porous layer to the microporous polyolefin web.

* * * * *